United States Patent [19]

Stemler

[11] Patent Number: 6,030,125
[45] Date of Patent: Feb. 29, 2000

[54] WEAR COMPENSATING PRECISION GIB INCORPORATING LINEAR SLIDE ASSEMBLIES AND METHODS OF CONSTRUCTING THEM

[75] Inventor: Kim F. Stemler, Saginaw, Mich.

[73] Assignee: Werth Engineering, Inc., Bay City, Mass.

[21] Appl. No.: 09/185,942

[22] Filed: Nov. 4, 1998

Related U.S. Application Data

[63] Continuation-in-part of application No. 08/977,098, Nov. 24, 1997, abandoned.

[51] Int. Cl.[7] .................................................. F16C 29/12
[52] U.S. Cl. ........................................................... 384/39
[58] Field of Search ................................. 384/39, 40, 26

[56] References Cited

U.S. PATENT DOCUMENTS

| | | | |
|---|---|---|---|
| 1,285,628 | 11/1918 | Craley | 384/39 |
| 1,917,926 | 7/1933 | Decker | 384/39 |
| 2,104,299 | 1/1938 | Grundstein | 384/39 |
| 2,581,602 | 1/1952 | Pulsifer | 384/39 |
| 3,702,716 | 11/1972 | Decker | 384/39 |
| 3,953,086 | 4/1976 | Chaffin | 384/39 |
| 4,489,924 | 12/1984 | McDougal | 384/39 X |
| 4,504,096 | 3/1985 | Roch | 384/39 |
| 4,515,414 | 5/1985 | Werth, Jr. | 384/39 |
| 4,702,621 | 10/1987 | Heinonen et al. | 384/37 |

OTHER PUBLICATIONS

THK, 2. Types and Features of Linear Motion Systems 1 page prior art reference, date unknown.

*Primary Examiner*—Thomas R. Hannon
*Attorney, Agent, or Firm*—Reising, Ethington, Barnes, Kisselle, Learman & McCulloch, P.C.

[57] ABSTRACT

A wear compensating, precision, linear slide assembly comprises a slide support having a base and an elongate guide rail. The rail has flat longitudinal exterior side walls convergently inclined toward the base and a slide has a guide rail receiving slot with flat longitudinal side walls convergently inclined toward the rail base. The transverse width of the slot is greater than the transverse width of the rail to define a longitudinal space between one side wall of the rail and one of the side walls of the slide. An elongate gib is received within the space and has divergent side walls mating with the side walls of the slide and guide rail. At least one end cap fixed to the slide has a cam part opposite one end of the gib and a cam part on the gib is cooperable therewith to urge the gib to automatically wedge between the guide rail and slide in a direction away from the base as permitted by wear.

21 Claims, 6 Drawing Sheets

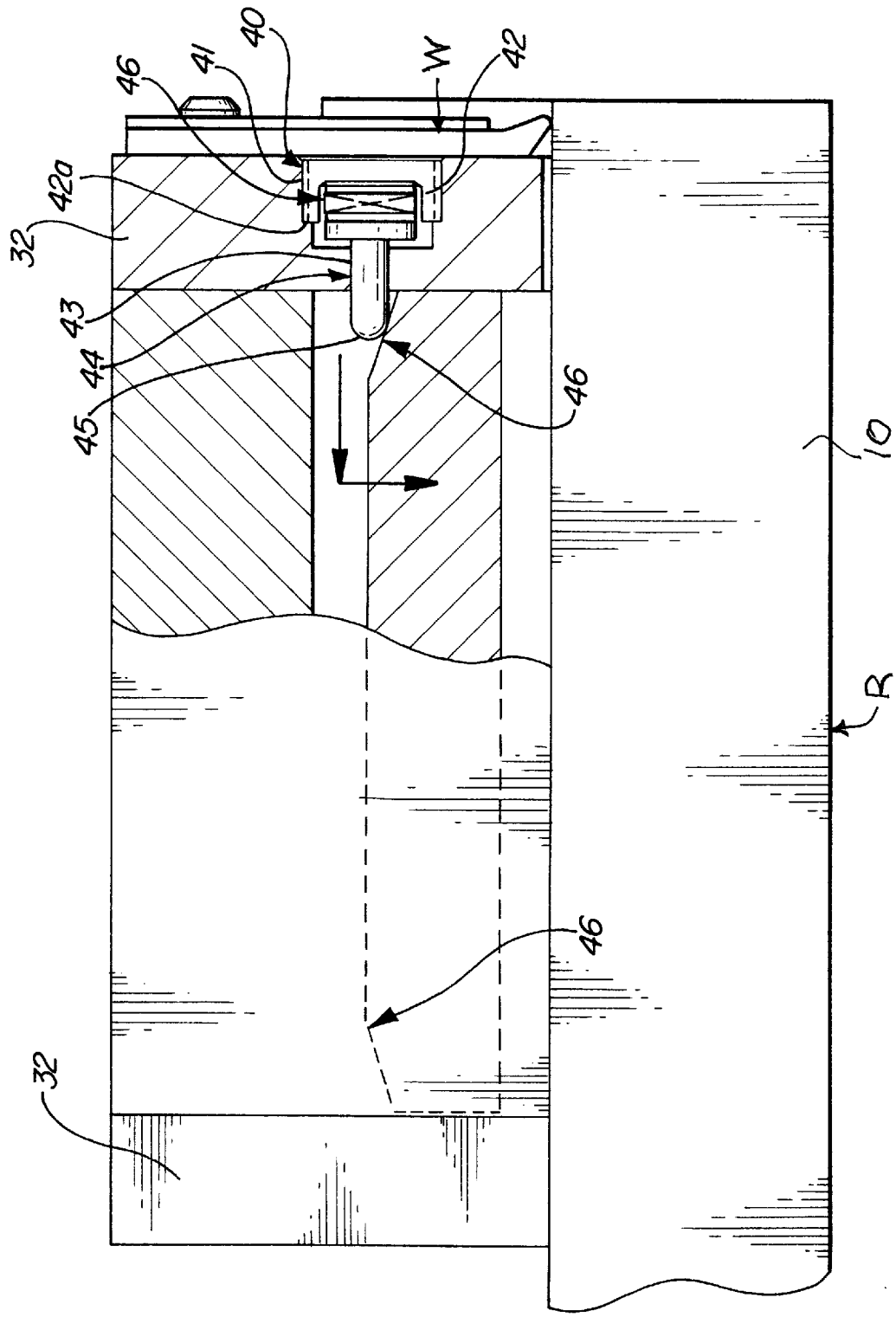

WEAR COMPENSATING PRECISION GIB INCORPORATING LINEAR SLIDE ASSEMBLIES AND METHODS OF CONSTRUCTING THEM

The present invention is a continuation in part of U.S. patent application Ser. No. 08/977,098 filed Nov. 25, 1997 now abandoned and is directed to improved automatically adjusting gib systems which may be preset to establish a predetermined wedging pressure between the opposed slide surfaces of a guide rail and slide. The application is concerned with automatically compensating systems of the general type disclosed in the present assignee's U.S. Pat. No. 4,515,414, and is directed to an improved construction in which wear is compensated in, not one, but two directions. The construction automatically removes all looseness or lash between the two sliding parts to produce a zero transverse clearance between the side walls of the slot, gib, and guide rail. Such linear motion systems will be utilized for machining tables, transfer equipment, medical equipment, injection molding machines, woodworking machines, and other machinery where stiffer ultra precision slides are required to replace prior art commercial systems in present use of the type which utilize balls or rollers between the sliding parts. Such ball or roller systems which make only point or line contact are not holding up in high production applications in the manner desired by customers.

SUMMARY OF THE INVENTION

The precision slide assembly of the present invention comprises a guide support base having an elongate guide rail thereon with flat linear exterior side walls convergently inclined relative to the axis of movement of the slide in a direction toward the base. The slide has an elongate guide rail receiving slot with similarly convergently inclined walls and with the transverse width of the slot being greater than the transverse width of the rail to define a gib receiving longitudinal space between one side wall of the rail and one of the side walls of the slide.

The gib, which is received within the space, has divergent side walls of different axial inclination mating with the adjacent side walls of the slide and guide rail and is resiliently biased by a cam system of the general type disclosed in the foregoing U.S. patent, which is incorporated herein by reference. The present system, however, departs from the previous concept and the cam system is differently disposed to urge the gib to wedge between the guide rail and the slide in a direction away from the base, as permitted by wear between the rail and the slide walls.

One of the prime objects of the present invention is to design a gib system which will fit in the same space as do present day, ball, or roller type linear rails, but which will be much more rigid and provide high load dampening as well as automatic wear compensation in two directions.

Another object of the invention is to provide a durable and reliable linear slide assembly for machining operations which will maintain its rigidity and which provides essentially zero clearance in its longitudinal movement in a manner which better absorbs both vertical and radial load forces and thereby reduces cutting tool vibration.

Another object of the invention is to provide an automatically compensating gib system which eliminates the possibility of human error in incorrect adjustment which would leave the assembly too tight or too loose, and cause vibration and size variance in a machining operation.

A further object of the invention is to provide a slide assembly in which both ends will adjust independently as necessary to correct for size variance between the sliding parts.

A still further object of the invention is to provide a slide assembly which need not employ the conventional slide hold-down plates.

THE DRAWINGS

The presently preferred embodiment of the invention is disclosed in the following description and in the accompanying drawings, wherein:

FIG. 11 is a partly sectional schematic, side elevational view illustrating an improved embodiment of the invention.

DETAILED DESCRIPTION

Figure 1:
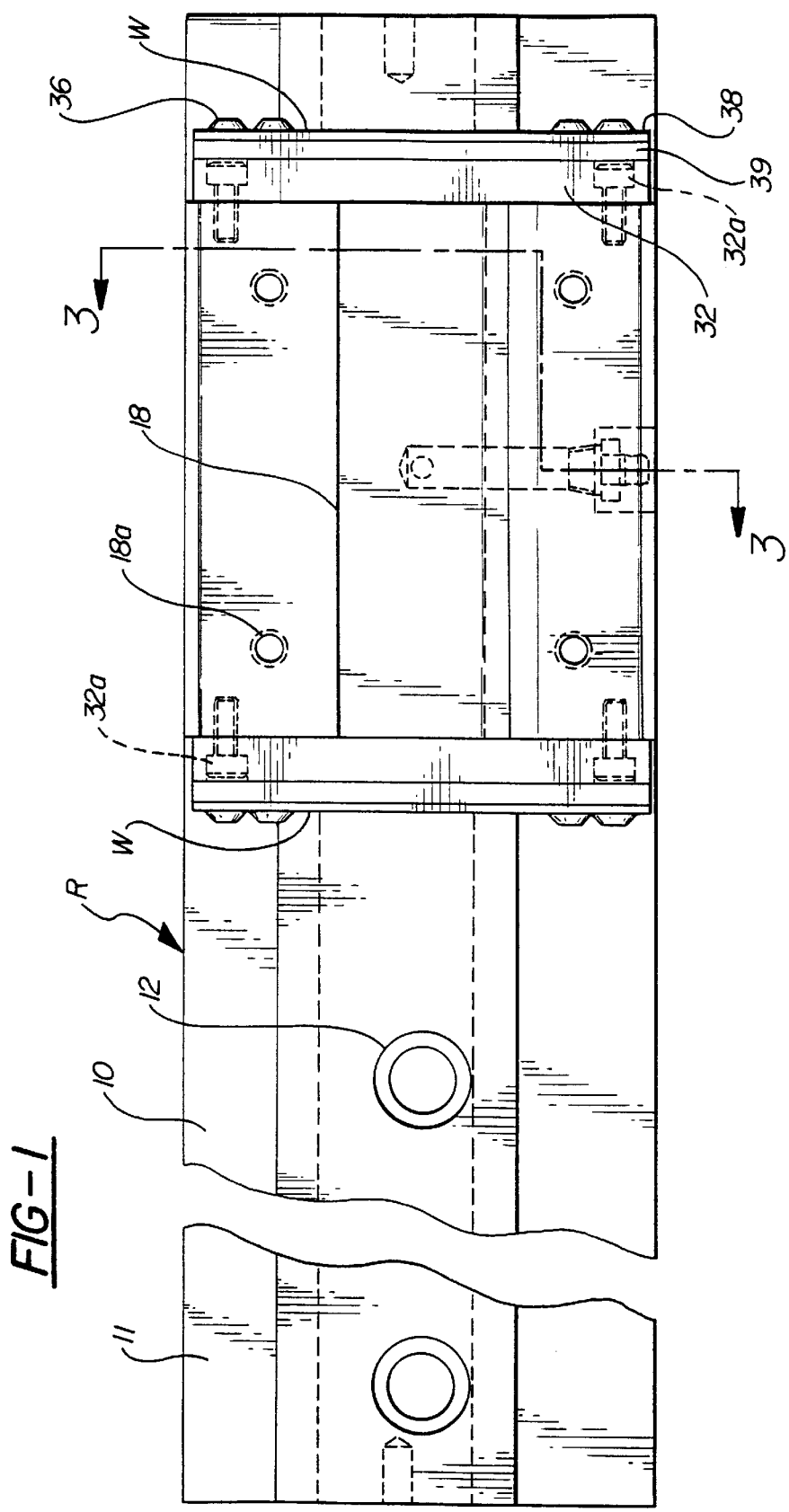
FIG. 1 is a top plan schematic view of the slide assembly.
Figure 2:
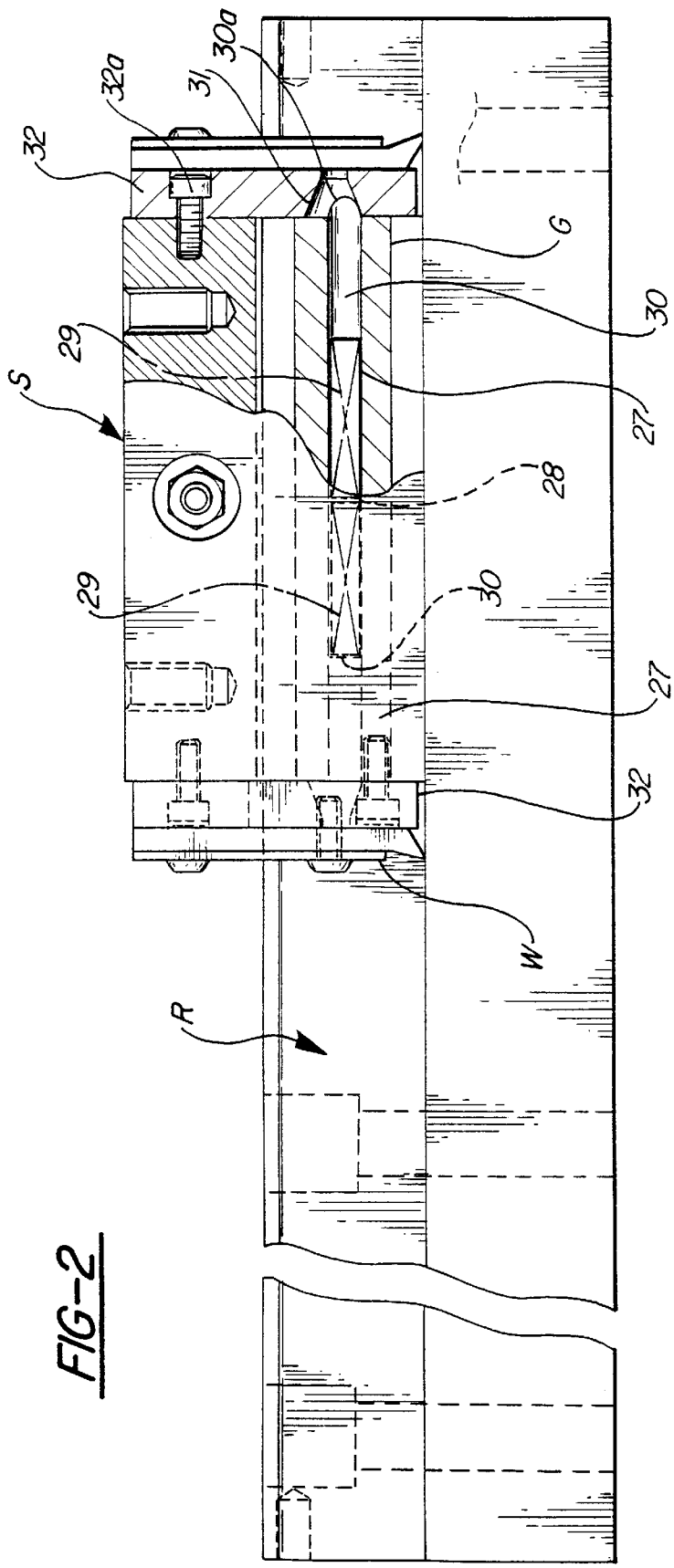
FIG. 2 is a partly sectional, schematic side elevational view thereof.
Figure 3:
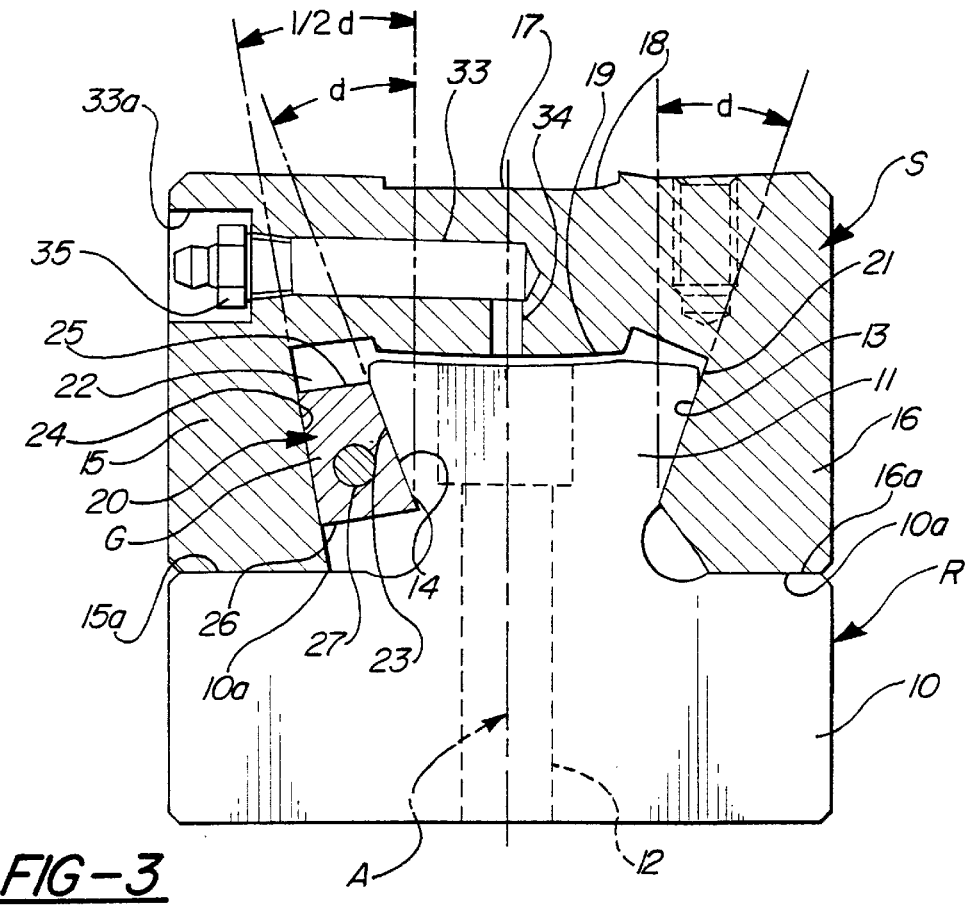
FIG. 3 is a sectional elevational view on an enlarged scale, taken on the line 3—3 of FIG. 1.

Referring more particularly to the accompanying drawings, and in the first instance to FIGS. 1–3, the elongate linear slide rail or way assembly, generally designated R, is shown as having a base 10 and a slide rail 11. The rail assembly R may be bolted to the frame of any machine requiring a precision linear slide assembly and is provided with bolt holes 12 to accomplish this. As will be seen, the slide rail 11 has side walls 13 and 14 which converge in a direction toward the base 10.

Mounted to move linearly on the rail 11 is the slide, generally designated S. The slide has dependent legs or sides 15 and 16 joined by an upper bridging top wall 17. Typically, the slide S may mount a workpiece to be machined, or a machining tool and a slotted recess 18 and bolt openings 18a are provided to facilitate this. While the slide S and rail 11 are shown in upright position in the various figures, it is to be understood that the slide S and rail 11, to be described and claimed, may be used in side disposition or even in inverted position, without in any way departing from the spirit or scope of the claimed invention.

The slide legs 15 and 16 and bridging portion 17, define a slot, generally designated 19, and the legs 15 and 16 are formed with flat longitudinal side walls 20 and 21, which also convergently incline in a direction toward the rail base 10. The transverse width of the slot 19 is, as will be noted, greater than the transverse width of the rail portion 11 to define a longitudinal space 22 which is part of slot 19 and extends between one side wall 14 of the rail 11 and one of the side walls 20 of the slide S.

Provided within the opening 22 between the surfaces 14 and 20 is a differentially angled gib, generally designated G, which has divergently angular walls 23 and 24, in contrast to the convergently angled walls of the slide S and rail 11. It is to be observed that the top face 25 of the gib G is of reduced width relative to the bottom face 26, and that the diverging walls 23 and 24 mate with the walls 14 and 20, respectively.

It will be observed from FIG. 2 that the gib G is of the same length as the slide S, and is provided with a longitudinally extending, horizontal bore 27, which is bridged intermediately by a dual spring seat wall 28. Received within the bore 27, on each side of the seat 28, is a biasing compression coil spring 29 which exerts a continuous pressure upon a pin 30. It will be noted that the pins 30, which are freely slideable within the bore 27, are in engagement with the frustroconical bore portion 31, which is respectively provided in an end plate or gib retainer block 32 which is fixed to overhang the gib G on each end of the slide S, as with cap screws 32a.

It is important to note that the frustroconical bore 31 diverges in an axially outward direction and that the hemispherical ends 30a of the adjuster pins 30 are in engagement with the lowermost surfaces of the bores 31. This means that, when due to wear, the pins 30 are moved by the springs 29 outwardly, the teflon coated gib G will be forced upwardly in a direction away from the base 10 of the rail R. Each pin 30 may be referenced as a cam member or a cam surface, and so may each bore 31.

As FIG. 3 plainly shows, the slide S is horizontally bored as at 33 and then vertically bored as at 34 to permit the passage of a suitable lubricant or grease to the space 19, and a lubrication fitting 35 is secured within a counterbore 33a.

Figure 4:
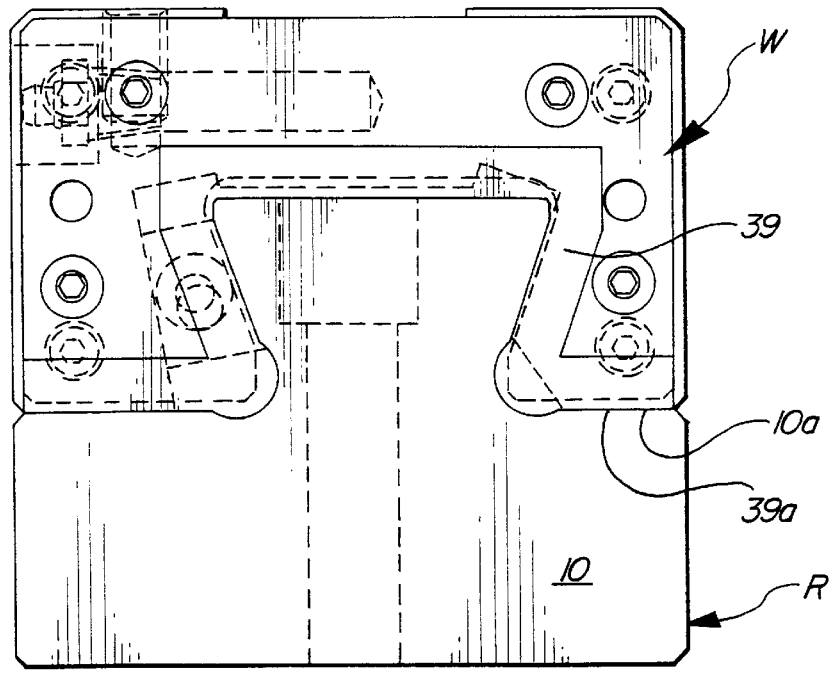
FIG. 4 is an end elevational view of the slide assembly which shows the wiper element at one end thereof.
Figure 5:
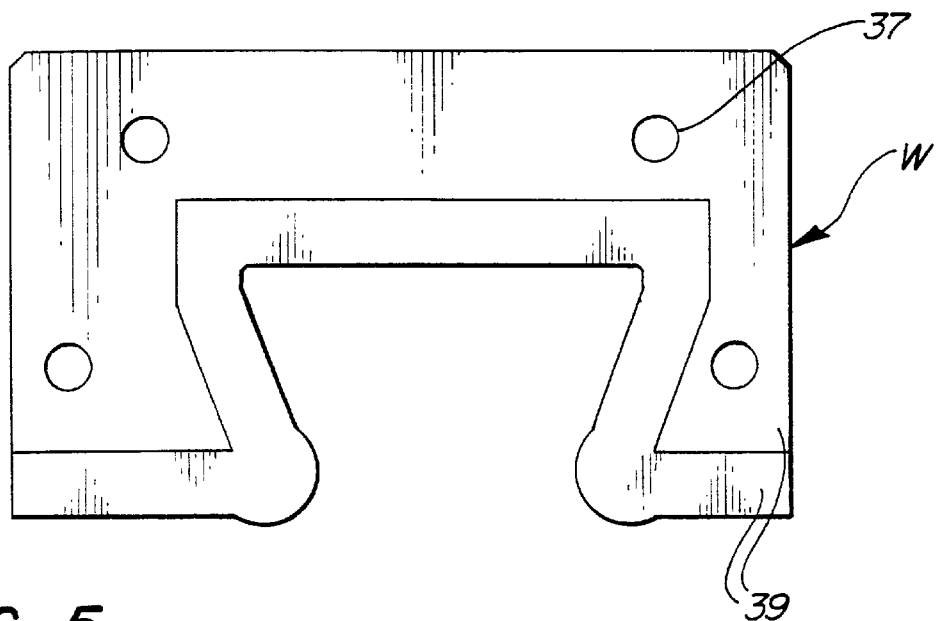
FIG. 5 is an end elevational view of one of the wiper elements.
Figure 6:
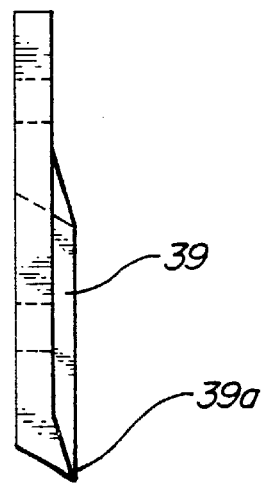
FIG. 6 is an edge elevational view of the wiper elements only.
Figure 7:
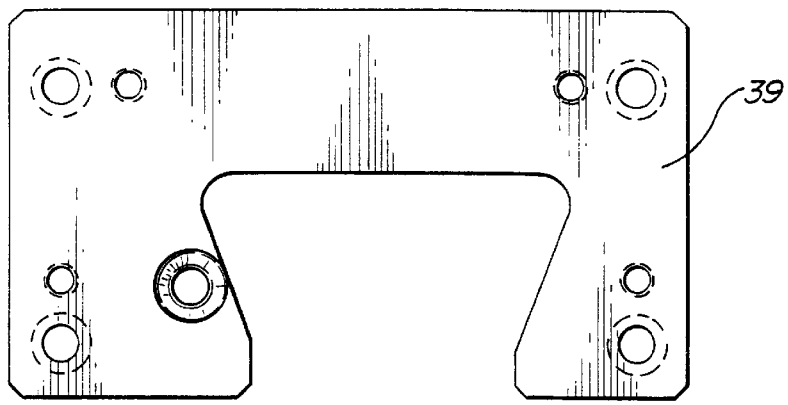
FIG. 7 is an end elevational view of one of one of the end caps which mount to the slide.
Figure 8:
FIG. 8 is an edge elevational view thereof.
Figure 9:
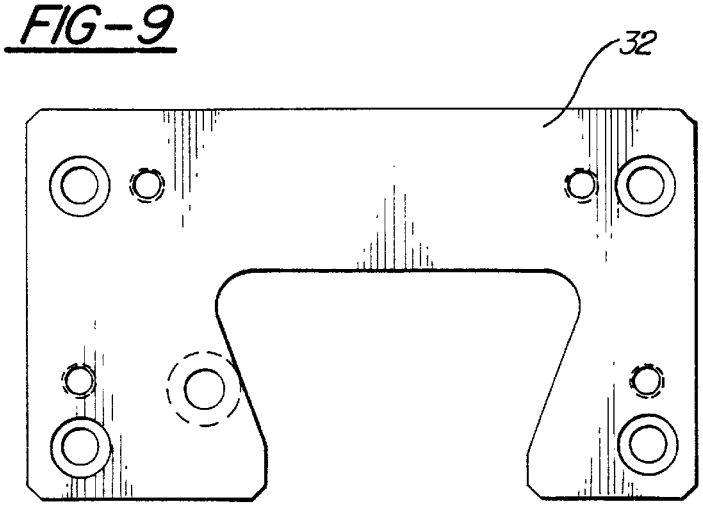
FIG. 9 is an elevational view of the other end cap.
Figure 10:
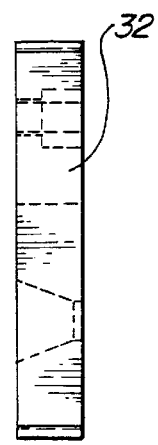
FIG. 10 is an end elevational view thereof on a slightly larger scale.

At each end of the slide S, a wiper assembly, generally designated W (FIGS. 5 and 6), is affixed by means of suitable fasteners 36 extending through openings 37 in a steel holder plate 38 which mounts a resilient (i.e. neoprene) wiper blade 39, which is of the configuration of the rail or way 11. It will be seen that the base 10 has an upper flame-hardened surface or shelf 10a, which is engaged by the lower ends 15a and 16a of the slide legs 15 and 16 and, as FIG. 4 shows, the inversely U-shaped wiper blade 39 engages the surfaces 10a of the rail base 10, as well as the flame-hardened side wall surfaces 13 and 14 of the rail 11, and maintains contact with them as the slide S moves along the rail or way 11 in either direction. The lubricant grease will, accordingly, be trapped within the slot 19 by the knife edges 39a. Because the slot 19 is symmetrically off center with respect to the vertical axis A of the way R (see FIG. 3), a left hand end cap or end plate 32 and a right hand end cap or end plate 32 is required as shown in FIGS. 9 and 10, and 7 and 8. The wipers w similarly need to be right hand and left hand (or mirror images) to accommodate to the shape of the slide S. Particularly, for clean room operation in the medical or computer area where a lubricant cannot be used, all sliding surfaces can be teflon coated.

The Operation

Machining operations, in particular, provide both heavy radial as well as heavy vertical loads on the slide S. These loads must be absorbed to prevent tool chatter and excessive vibration, and the bearing surfaces at 10a–15a, 10a–16a, 13–21, 14–23, and 20–24 provide significant surface area to absorb these loads. Wear is expected at these surface interfaces, and with the present construction, wear in both the vertical and radial directions is automatically compensated by the present construction. Moreover, the present construction is better able to absorb or dampen the loads which are imposed.

The gib G may, thus, be termed a "bidirectional" or dually angled gib G, in that it compensates for loads in two directions by moving upwardly, to fill any space created by wear. With the springs 29 exerting a constant pressure, of limited force, of course, on the undercam surfaces of frustroconical bores 31, any wear which permits upward movement will be automatically compensated. Moreover, this compensation will position the gib G in accordance with uneven wear which might occur at the opposite ends of the slide S.

It was previously noted that the gib G was designated a differential angle gib. The angle alpha (L), in FIG. 3, between a vertical plane and the surface 23, will be twice the angle of the surface 24 with respect to the same vertical plane. Typically, the angle alpha can be 20 degrees. This difference in angularity provides a self-locking feature tending to prevent the gib G from dropping downwardly. Also because the differential angularity tends to pull the slide S downwardly, the normal hold down plates which wear in use can be eliminated.

While I have designated the surface 14 as the surface of the rail 11, plainly an intermediate plate or surface affixed to the rail 11 could be employed and this surface would, within the meaning of this description and the claims, constitute the side wall of the rail 11. Similarly a plate or the like could be secured to the side wall surface 20 of the slide S and such a plate would, within the meaning of this description and the claims, constitute the side wall of the slide.

An Further Embodiment

In FIG. 11, another embodiment of the invention, is disclosed in which the same numerals will be used to describe the same parts and only the differences in construction will now be described.

The construction, essentially, is a reversal of cam parts in which the end caps carry the pins and the cam surfaces are provided on both ends of the gib. The end caps 32, in this version, are provided with recessed openings, generally designated 40, including a portion 41 for receiving a spring retaining plug or cup 42 against a shouldered portion 42a and a reduced bore portion 43 for freely slideably accommodating the plunger or pin 44, which has a curvilinear cam surface 45 thereon. Spring wave washers, generally designated 46, provided in the spring retaining plug or spring retainer 42, bias the plunger or pin 43 into continual engagement with a cam part or surface 46 provided on the gib G. The wiper construction W previously mentioned secures to each end cap 32 and maintains the position of each spring cup or retainer 42.

While the construction described has been shown only at the right end of the assembly shown in FIG. 11, it is to be understood that an identical construction is used also at the left end of the assembly. The springs 29 used in the previous construction, of course, are not required in this modified construction.

While the operation of this embodiment of the invention is the same as previously described, the modified construction is easier and more economical to manufacture. By placing the pins in the end caps and using the tapering or axially inclined surfaces on the gib the need to hold a lot of close tolerances is avoided.

The disclosed embodiment is representative of a presently preferred form of the invention, but is intended to be illustrative rather than definitive thereof. The invention is defined in the claims.

I claim:

1. In an improved wear compensating precision linear slide assembly comprising a slide support having a base, and an elongate guide rail thereon with flat longitudinal exterior side walls convergently inclined toward said base, a slide having an elongate guide rail receiving slot therein with flat longitudinal interior side walls convergently inclined toward said base, the transverse width of said slot being greater than the transverse width of said rail to define a longitudinal space between one side wall of the rail and one of the side walls of the slide, and an elongate gib received within said space and engaged between the said one side wall of the rail and the said one side wall of the slide, the improvement wherein said gib has divergent side walls of different axial inclination relative to a vertical plane mating with the adjacent said side walls of the slide and guide rail, an end cap is fixed to said slide which has a lower cam surface opposite one end of said gib, and a resiliently biased cam member is carried by said gib and is cooperable with said cam surface to urge said gib to automatically wedge upwardly between said guide rail and slide in a direction away from said base as permitted by wear between said one wall of the rail and said one wall of the slide.

2. The slide assembly of claim 1 wherein an end cap is fixed to the opposite end of said slide which has a second cam surface overlying the other end of said gib, and a second resiliently biased cam member is cooperable with said second cam surface to urge said other end of said gib to wedge between said guide rail and slide in a direction away from said base as permitted by wear.

3. The slide assembly of claim 2 wherein flexible wiper elements carried by said slide at each end engage the base of the rail and the rail walls to hold lubricant within the confines of the slide.

4. The slide assembly of claim 2 wherein each cam member comprises a pin mounted to extend longitudinally in and from said gib at opposite ends thereof, and each cam surface comprises a frustroconical bore in one of said end caps sloped axially to cause said pins to be urged by said caps in a direction away from said base with any additional extension of the pins from said gib.

5. The slide assembly of claim 4 wherein said pins seat in a common longitudinal bore in said gib, and in each instance a compression spring seats longitudinally inwardly of each pin in said bore.

6. The slide assembly of claim 4 wherein said slide overlies said gib and said pins project longitudinally off axis to the axis of said frustroconical bores and engage the lower surfaces of the frustroconical bores.

7. The slide assembly of claim 1 wherein the angularity of the side of the gib engaging the slide with respect to a vertical plane is substantially one half the angularity of the side of the gib engaging the rail.

8. A method of making a precision linear slide assembly comprising the steps of:
   a) providing a slide support having a base and an elongate guide rail thereon with flat longitudinal exterior side walls convergently inclined toward said base, the slide having an elongate guide rail receiving slot therein with flat longitudinal interior side walls convergently inclined toward said base, the transverse width of said slot being greater than the transverse width of said rail to define a longitudinal space between one side wall of the rail and one of the side walls of the slide;
   b) inserting an elongate gib within said space, engaged between the said one side wall of the rail and the said one side wall of the slide;
   c) affixing an end cap to said slide which has a cam surface opposite one end of said gib; and
   d) providing a cam surface on said gib to cooperate with said cam surface on the end cap; and
   e) relatively biasing said cam surfaces to urge said gib to wedge between said guide rail and slide in a direction away from said base as permitted by wear between said one wall of the rail and said one wall of the slide.

9. The method of claim 8 further comprising affixing an end cap to the opposite end of said slide which has an opposite end cam surface at the other end of said gib, providing an opposite end cam surface on the gib which is cooperable therewith, and relatively biasing said opposite end cam surfaces to urge said other end of said gib to wedge between said guide rail and slide in a direction away from said base as permitted by wear.

10. The method of claim 9 comprising affixing flexible wiper elements to each end of said slide which engage the base of the rail and the rail slide walls to hold lubricant within the confines of the slide.

11. The method of claim 9 comprising mounting pins which constitute said cam surfaces on the end caps to extend longitudinally in and from said end caps at opposite ends thereof, and providing adjacent inclined cam surfaces in said gib at both ends thereof which are sloped to cause said pins to be urged in a direction away from said base with any additional extension of the pins from said end caps.

12. The method of claim 11 comprising providing springs in said end caps for biasing said pins.

13. The method of claim 8 comprising providing a gib wherein the angularity of the side of the gib engaging the slide with respect to a vertical plane is substantially one half the angularity of the side engaging the rail.

14. An improved automatically compensating precision linear slide assembly comprising:
   a) a slide support having a base and an elongate guide rail thereon with flat longitudinal exterior side walls convergently inclined toward said base;
   b) a slide having an elongate guide rail receiving slot therein with flat longitudinal interior side walls convergently inclined toward said base, the transverse width of said slot being greater than the transverse width of said rail to define a longitudinal space between one side wall of the rail and one of the side walls of the slide;
   c) an elongate gib received within said space and engaged between the said one side wall of the rail and the said one side wall of the slide, said gib having divergent side walls mating with the adjacent said side walls of the slide and guide rail;
   d) an end cap fixed to said slide to overlie one end of said gib and having a cam surface endwisely opposite said gib;
   e) a cam member carried by said gib in engagement with said cam surface; and
   f) an element relatively biasing said cam member and cam surface to urge said gib to wedge between said guide rail and slide in a direction away from said base as permitted by wear between said one wall of the rail and said one wall of the slide.

15. The slide assembly of claim 14 wherein an end cap is fixed to the opposite end of said slide and has a second cam surface opposite the other end of said gib, a second cam member is cooperable with said second cam surface, and an element is provided to urge said other end of said gib to wedge between said guide rail and slide in a direction away from said base as permitted by wear between said one wall of the rail and said one wall of the slide.

16. The slide assembly of claim 15 wherein each cam member comprises a pin mounted to extend longitudinally in and from said gib at opposite ends thereof and each cam surface comprises a frustroconical bore in said end cap sloped to cause said pins to be urged by said caps in a direction away from said base with any additional extension of the pins from said gib.

17. The slide assembly of claim 16 wherein said pins project longitudinally off axis to the axes of said frustroconcial bores and engage the lower surfaces of the frustroconical bores.

18. The slide assembly of claim 14 wherein the angularity of the side of the gib engaging the slide with respect to a vertical plane is generally one half the angularity with respect to said plane of the side engaging the rail.

19. The slide assembly of claim 14 wherein said cam member is an axially angular surface carried on said gib and said cam surface is a spring biased pin mounted to extend longitudinally from said end cap.

20. The slide assembly of claim 19 wherein said end cap carries a spring retainer with a spring positioned to urge said pin axially in a direction toward said gib and said axially angular surface.

21. An improved automatically compensating precision linear slide assembly comprising:

a) a slide support having a base and an elongate guide rail thereon with flat longitudinal exterior side walls convergently inclined toward said base;

b) a slide having an elongate guide rail receiving slot therein with flat longitudinal interior side walls convergently inclined toward said base, the transverse width of said slot being greater than the transverse width of said rail to define a longitudinal space between one side wall of the rail and one of the side walls of the slide;

c) an elongate gib received within said space and engaged between the said one side wall of the rail and the said one side wall of the slide, said gib having divergent side walls mating with the adjacent said side walls of the slide and guide rail;

d) an end cap fixed to said slide to lie adjacent one end of said gib;

e) a cam device including a first cam part carried on said end cap endwisely opposite said gib and a second cam part carried by said gib in alignment with said first cam part; and f) an element relatively biasing said cam parts to urge said gib to wedge between said guide rail and slide in a direction away from said base as permitted by wear between said one wall of the rail and said one wall of the slide.

* * * * *

UNITED STATES PATENT AND TRADEMARK OFFICE
CERTIFICATE OF CORRECTION

PATENT NO. : 6,030,125
DATED : February 29, 2000
INVENTOR(S) : Kim F. Stemler

It is certified that error appears in the above-identified patent and that said Letters Patent is hereby corrected as shown below:

On the title page:

Section [73] Assignee:, Change "Mass." to -- Mich. --.

Section [63] change "08/977,098" to -- 08/977,998 --.

Column 1, line 7, change "08/977,098" to -- 08/977,998 --.

Signed and Sealed this

Twenty-fourth Day of April, 2001

Attest:

NICHOLAS P. GODICI

*Attesting Officer*     *Acting Director of the United States Patent and Trademark Office*